United States Patent
Adelski et al.

[11] Patent Number: 5,861,688
[45] Date of Patent: Jan. 19, 1999

[54] DRIVE UNIT HAVING A POT-SHAPED DRUM

[75] Inventors: Hans-Joachim Adelski, Salz; Hans Gempel, Wollbach; Herbert Wagner, Bad Neustadt, all of Germany

[73] Assignee: Siemens Aktiengesellschaft, Munich, Germany

[21] Appl. No.: 649,702

[22] PCT Filed: Dec. 2, 1994

[86] PCT No.: PCT/DE94/01444

§ 371 Date: May 30, 1996

§ 102(e) Date: May 30, 1996

[87] PCT Pub. No.: WO95/17034

PCT Pub. Date: Jun. 22, 1996

[30] Foreign Application Priority Data

Dec. 15, 1993 [DE] Germany .................. 43 42 780.4

[51] Int. Cl.⁶ .................. H02K 9/00; H02K 9/14; H02K 5/10

[52] U.S. Cl. .................. 310/59; 310/58; 310/60 R; 310/60 A

[58] Field of Search .................. 310/52, 58, 59, 310/60 R, 60 A, 63, 64, 67 R, 98

[56] References Cited

U.S. PATENT DOCUMENTS

| | | | |
|---|---|---|---|
| 2,769,105 | 10/1956 | Altschwager et al. | 310/58 |
| 3,449,605 | 6/1969 | Wilson | 310/62 |
| 3,610,975 | 10/1971 | Onjanow | 310/57 |
| 3,739,207 | 6/1973 | Keilmann et al. | 310/52 |
| 3,882,335 | 5/1975 | Fries | 310/61 |
| 4,244,098 | 1/1981 | Barcus | 29/596 |
| 4,609,840 | 9/1986 | Eats et al. | 310/58 |
| 4,818,906 | 4/1989 | Kitamura et al. | 310/58 |
| 4,839,547 | 6/1989 | Lordo et al. | 310/60 A |
| 5,073,736 | 12/1991 | Gschwender et al. | 310/88 |
| 5,449,961 | 9/1995 | Ludwig et al. | 310/58 |

FOREIGN PATENT DOCUMENTS

| | | |
|---|---|---|
| 0 423 616 | 4/1991 | European Pat. Off. . |
| 0 452 518 | 10/1991 | European Pat. Off. . |
| 1 026 840 | 3/1958 | Germany . |
| 2 145 919 | 3/1973 | Germany . |
| 2 160 924 | 1/1986 | United Kingdom . |

Primary Examiner—Thomas M. Dougherty
Assistant Examiner—Tran N Nguyen
Attorney, Agent, or Firm—Kenyon & Kenyon

[57] ABSTRACT

A drive unit is provided including an electric motor and a pot-shaped drum driven by the electric motor. The drum accommodates the electric motor and is connected by means of its pot base to the drive-side shaft end of the electric motor. Improved power utilization of the electric motor is made possible by at least one web extending in the axial direction of the drive unit and projecting radially into the gap between the housing of the electric motor and the drum inner wall. The at least one web is arranged on the housing of the electric motor and/or on the drum inner wall and/or at least one through-hole is provided in the pot base of the drum.

7 Claims, 2 Drawing Sheets

DRIVE UNIT HAVING A POT-SHAPED DRUM

FIELD OF THE INVENTION

The present invention relates to a drive unit including an electric motor and a pot-shaped drum that accommodates and is driven by the electric motor. The pot base of the drum is connected to the drive-side shaft of the electric motor. The pot base includes at least one through-hole.

BACKGROUND OF THE INVENTION

Such a drive unit is disclosed in EP-A-0 423 616. In order to enable flow of a sufficient quantity of cooling air through holes in the pot base, axially projecting vanes are assigned to the holes on the outside of the pot base. If such a drive unit is not equipped with a separate protective grating, then there is an increased risk of injury from the projecting vanes.

When such a drive unit is used in textile operations, there is also a risk of fluff becoming trapped on the vanes and, consequently, of the holes provided in the pot base becoming blocked as a result of the normally high incidence of fluff. As a result, sufficient cooling of the motor inside the drum is no longer ensured.

Also, GB-A-2 160 924 discloses an axial fan in which the drive motor is seated in the hub, which is designed in the form of a bell, of the axial impeller wheel. Openings are provided in the transition region of the bell base, which is connected to the motor shaft, leading to the bell wall for passage of cooling air flow therethrough. This air flow passes between the surface of the drive motor and the inside of the bell wall. The cooling air flow receives its drive energy from the pressure difference produced between the two vane sides of the axial impeller wheel.

OBJECTS AND SUMMARY OF THE INVENTION

One object of the present invention is to provide a drive unit providing sufficient cooling air flow without any conveying means on the outer surface of the drive unit.

This object is achieved according to the invention by providing at least one web extending in the axial direction of the drive unit and projecting radially into the gap between the housing of the electric motor and the inner wall of the drum. The at least one web is arranged on the housing of the electric motor and/or on the drum inner wall, and the radial length of the web is less than the radial width of the gap. Ram-air pressure is produced on the web or webs projecting into the gap as a result of the rotation of the drum. This ram-air pressure leads to air movement in the gap. A flow movement of this sort in the gap is also achieved by a drive unit, in which the drum inner wall extends obliquely towards the pot base, which is provided with through-holes, or towards the open side of the drum. The heat dissipation from the electric motor is improved by the air movement produced in the gap in this manner without any external conveying means.

The conveying effect of both the webs and the through-holes can be enhanced by arranging or designing them such that they in each case extend obliquely with respect to the axial direction of the drive unit.

Favorable flow conditions are achieved if the drum inner wall extends obliquely outward towards the pot base, and the through-hole is provided in the pot base such that it is aligned with respect to the drum inner wall. In this case, it is again advantageous that the through-hole is constructed such that it extends obliquely at the same gradient as the gradient of the drum inner wall. This results in the flow moving smoothly without any direction changes.

An increase in the quantity of cooling air conveyed can be achieved by a drive unit, in which the at least one web, which extends in the axial direction of the drive unit and projects radially into the gap between the housing and the drum inner wall, is arranged on the housing of the electric motor and/or on the drum inner wall.

BRIEF DESCRIPTION OF THE DRAWINGS

The invention is explained in greater detail in the following detailed description, with reference to exemplary embodiments illustrated in the drawings, in which.

DETAILED DESCRIPTION

Figure 1:
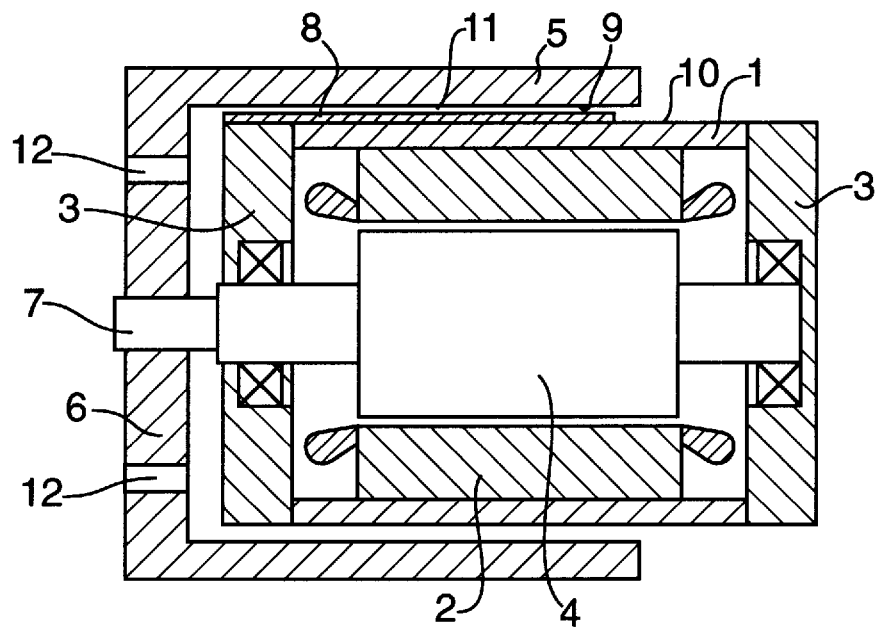
FIG. 1 is a longitudinal section view taken through a drive unit in accordance with one embodiment of the invention.
Figure 2:
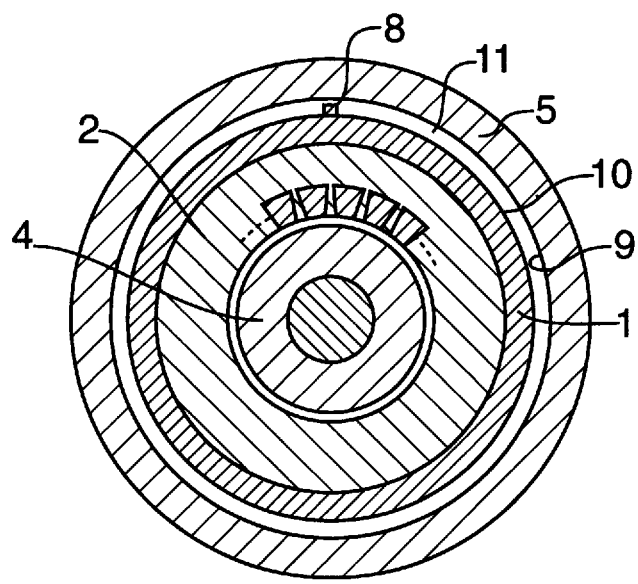
FIG. 2 is a cross-section view taken through the drive unit.

Reference numeral 1 designates the housing of an electric motor which encloses the stator 2 of the motor and on whose ends the bearing plates 3 for bearing the motor rotor 4 are mounted. The electric motor is enclosed by a pot-shaped drum 5 which is connected by means of its pot base 6 to the drive-side shaft end 7 of the electric motor and is thus driven by said electric motor.

At least one web 8 is arranged on the outer circumference of the housing 1 and projects radially into the gap 11 between the inner wall 9 of the drum 5 and the surface 10 of the housing 1, the radial length of the web 8 being dimensioned such that no touching of the drum inner wall 9 occurs. Alternatively, the web 8 can also be arranged on the inner wall 9 such that it projects radially towards the housing 1. In addition, it is possible to provide one or more webs 8 in each case both on the housing 1 and on the inner wall 9, their radial length again being dimensioned such that no touching of the same occurs, that is to say there is no blocking of the rotational movement of the drum 5.

As FIG. 1 shows, through-holes 12 are constructed in the pot base 6 of the drum 5. Air can enter the interior of the drum 5, or emerge from it, depending on the conveying direction via these through-holes 12, which air then emerges via the housing surface of the electric motor towards the open side of the drum 5, or enters via this open side.

It is advantageous for air conveyance if the webs 8 and/or the through-holes 12 are constructed such that they extend obliquely with respect to the axial direction of the drive unit. This assists in providing an axial conveying direction of the air and thus further improves the cooling of the electric motor.

Figure 3:
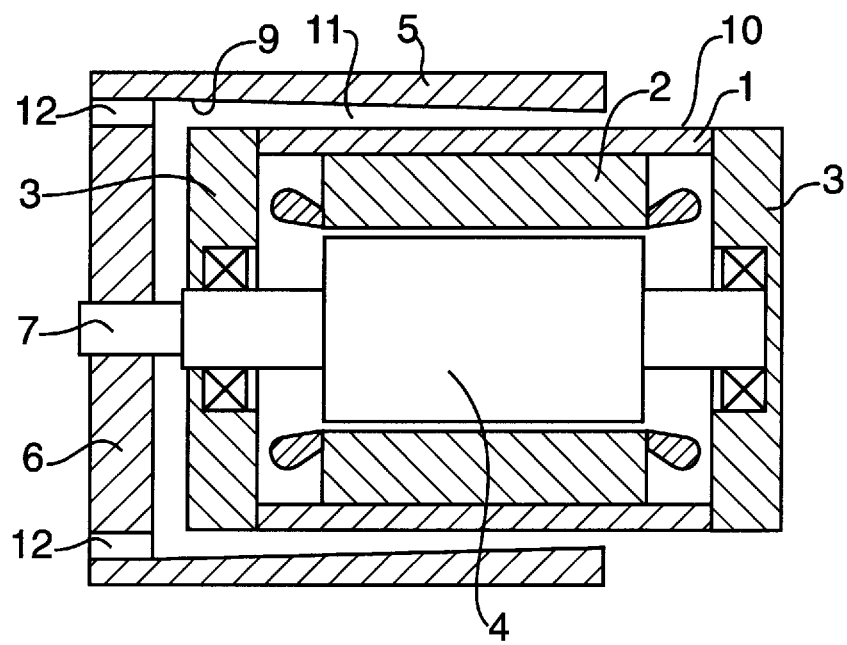
FIGS. 3 and 4 are longitudinal section views taken through further drive unit embodiments.
Figure 4:
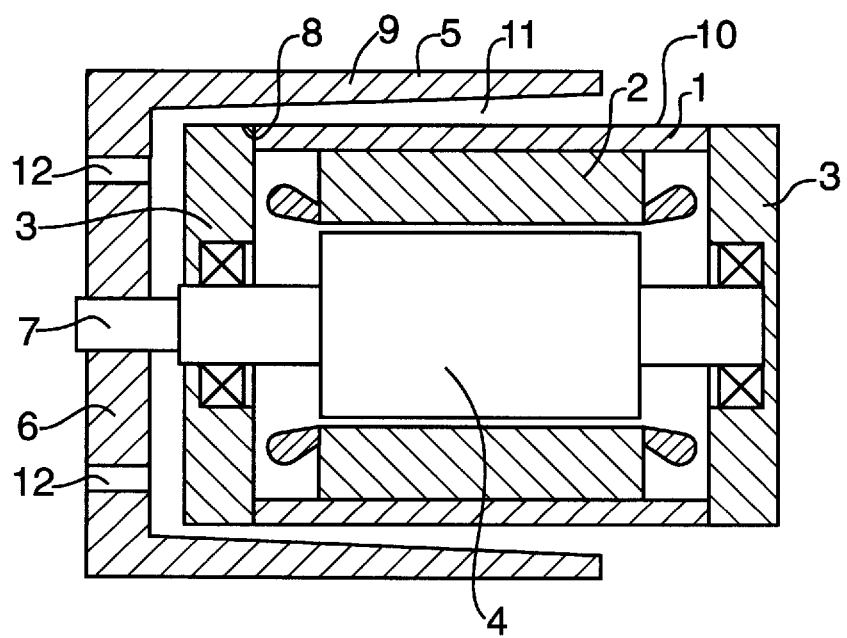

A conveying effect of the air through the gap 11 can also be achieved by the drum inner wall 9 extending obliquely outward, as is illustrated in the alternative embodiments illustrated in FIGS. 3 and 4. With the drum inner wall 9 extending obliquely, an axially directed component of the centrifugal force is produced by the rotational movement of the drum, which axially directed component leads to an axial flow movement of the air. The axial flow of the cooling air is made possible by the through-holes 12.

We claim:

1. A drive unit, comprising:

an electric motor including a housing and a drive-side shaft;

a pot-shaped drum accommodating the electric motor, wherein a gap is formed between the housing of the electric motor and an inner wall of the drum, the gap having a radial width, and wherein the drum is driven by the electric motor and includes a pot base being an integral part of the drum and being connected to the drive-side shaft of the electric motor, the drum having at least one through-hole in the pot base, wherein the through-hole extends obliquely with respect to the axial direction of the drive unit; and at least one web arranged on one of the housing and the drum inner wall, the web extending in an axial direction of the drive unit and projecting radially into the gap between the housing and the drum inner wall, the web having a radial width that is less than the radial width of the gap.

2. The drive unit of claim 1, wherein the web extends obliquely with respect to the axial direction of the drive unit.

3. A drive unit, comprising:

an electric motor including a housing and a drive-side shaft;

a pot-shaped drum accommodating the electric motor, wherein a gap is formed between the housing of the electric motor and an inner wall of the drum, the gap having a radial width, and wherein the drum is driven by the electric motor and includes a pot base being an integral part of the drum and being connected to the drive-side shaft of the electric motor, the pot base having at least one through-hole, wherein the through-hole extends obliquely with respect to the axial direction of the drive unit; and a first web arranged on the housing and a second web arranged on the drum inner wall, the first and second webs extending in an axial direction of the drive unit and projecting radially into the gap between the housing and the drum inner wall, the first and second webs having a combined radial width that is less than the radial width of the gap.

4. The drive unit of claim 3, wherein at least one of the first web and the second web extends obliquely with respect to the axial direction of the drive unit.

5. A drive unit, comprising:

an electric motor including a drive-side shaft; and a pot-shaped drum accommodating and being driven by the electric motor, the drum including a pot base at one end thereof and an opposite open end, the pot base being an integral part of the drum and being connected to the drive-side shaft of the electric motor, the pot base having at least one through-hole, wherein an inner wall of the drum extends obliquely outward towards the pot base, the through-hole in the pot base being aligned with the drum inner wall, and wherein the through-hole extends obliquely at the same gradient as the gradient of the drum inner wall.

6. The drive unit of claim 5, further comprising at least one web arranged on one of the electric motor housing and the drum inner wall, the web extending in an axial direction of the drive unit and projecting radially into the gap between the housing and the drum inner wall.

7. The drive unit of claim 5, further comprising a first web arranged on the electric motor housing and a second web arranged on the drum inner wall, the first and second webs extending in an axial direction of the drive unit and projecting radially into the gap between the housing and the drum inner wall.

* * * * *